United States Patent [19] [11] Patent Number: 4,686,246
Gajria [45] Date of Patent: Aug. 11, 1987

[54] SHOCK RESISTANT INK COMPOSITIONS AND WRITING INSTRUMENTS INCLUDING THE COMPOSITIONS

[75] Inventor: Chandrasen Gajria, Hingham, Mass.

[73] Assignee: The Gillette Company, Boston, Mass.

[21] Appl. No.: 812,684

[22] Filed: Dec. 23, 1985

[51] Int. Cl.$^4$ .................................................. C09D 5/00
[52] U.S. Cl. ....................................... 523/161; 401/232
[58] Field of Search ......................... 523/161; 401/232

[56] References Cited

U.S. PATENT DOCUMENTS

| | | | |
|---|---|---|---|
| 4,297,260 | 10/1981 | Ferree, Jr. et al. | 260/29.7 |
| 4,353,745 | 10/1982 | Ebbeler | 252/171 |
| 4,532,276 | 7/1985 | Knable et al. | 524/18 |
| 4,545,818 | 10/1985 | Inoue et al. | 106/22 |

FOREIGN PATENT DOCUMENTS 2094820  9/1982  United Kingdom .

Primary Examiner—Theodore Morris
Attorney, Agent, or Firm—John P. Morley

[57] ABSTRACT

Novel, improved aqueous based, shock resistant, shear-thinning ink compositions and writing instruments including the ink compositions. The ink compositions comprise a substantially uniform dispersion of colorant(s), a water dispersible polymeric shear-thinning material and a substantially water insoluble polymeric material in a polar solvent system.

34 Claims, No Drawings

SHOCK RESISTANT INK COMPOSITIONS AND WRITING INSTRUMENTS INCLUDING THE COMPOSITIONS

BACKGROUND OF THE INVENTION

Part 1. The Field of the Invention

This invention relates to novel, improved ink compositions and to writing instruments including such ink compositions. More precisely, the invention disclosed herein relates to aqueous ink compositions including water dispersible, polymeric shear-thinning providing materials and to writing instruments including the ink compositions.

Part 2. Description of the Prior Art

Ink compositions including water dispersible, polymeric, shear-thinning providing materials are disclosed in commonly assigned, copending application Ser. No. 693,930 filed Jan. 23, 1985 by Laura K. Case et al. application Ser. No. 693,930 is expressly incorporated herein in its entirety by reference. Essentially, the ink compositions disclosed in application Ser. No. 693,930 are thickened liquids at rest. They may have a rheological yield value and are highly pseudoplastic or shear-thinning in use. In other words, they become thin, readily flowable liquids having a viscosity of no greater than about 100 m Pa.s at shear rates produced in writing such as with a ball point pen. The ink compositions include at least one water dispersible, polymeric shear-thinning providing material uniformly dispersed in a highly polar solvent system which is preferably water or primarily water. Other materials such as coloring materials, surfactants, preservatives, corrosion inhibitors, humectants and the like can also he included in the inks. For the purposes of this invention, a water dispersible, polymeric shear-thinning providing material or shear-thinning material means those polymeric materials described in application Ser. No. 693,930 which can be dispersed in a highly polar solvent system to provide an ink having a shear-thinning index "n" of between about 0.01 to about 0.60. The shear-thinning index (n) is calculated by fitting shear stress (t) and shear rate (j) values (obtained from rheological measurements on a viscometer such as a Haake Rotovisco, Haake Inc. Saddle Brook, N.J.) to the empirical power law equation $t = Kj^n$ (K and n are calculated constants).

The preferred shear-thinning inks of U.S. Pat. application Ser. No. 693,930 include polymeric shear-thinning providing materials which are substantially water soluble. Accordingly on drying, the compositions provide a coalesced residue which is substantially water soluble and which exhibits a low degree of water-fastness. Moreover the shear-thinning inks have relatively high viscosities at low shear rates and, like other high viscosity inks, are susceptible or vulnerable to the effects of shock. Normally, the shear-thinning inks disclosed in U.S. application Ser. No. 693,930 are contained in hollow, non-pressurized tubes and fed directly to the nib or ball of the writing instrument. However, when the ink is contained in a non-pressurized tube, the instrument should be handled carefully to avoid shock. For example, if the instrument is dropped, tapped against a hard object or otherwise jarred, the column of ink in the tube may separate or be pulled or pushed away from the region of contact between the column of ink and the nib or ball. This separation can result in a pocket of air being established between the nib and the column of ink which can affect the writing performance of the instrument until contact between the ink column and the nib is restored.

As those in the art know, a high viscosity ink can be retained in hollow, pressurized tubes in order to control the effects of shock. However, pressurized tubes can present unattractive manufacturing cost features in terms of materials and assembly particularly for low priced, disposable writing instruments. This invention is addressed to the problems of controlling the effects of shock on high viscosity ink compositions and provides an especially effective solution to those problems.

BRIEF SUMMARY OF THE INVENTION

The novel, improved ink compositions of the present invention are aqueous based, shock resistant, shear-thinning inks for writing instruments. The ink compositions have a high viscosity at low shear rates and comprise a substantially uniform dispersion of colorant(s), a water dispersible, polymeric shear-thinning material and a substantially water insoluble but water dispersible polymeric, shock resistant providing material in a polar solvent system. In addition to being shock-resistant and shear-thinning, the preferred ink compositions are also water-fast. These preferred shock resistant, shear-thinning, water-fast ink compositions include substantially water insoluble colorant materials and polymeric materials which remain substantially water insoluble when the ink composition is dry. While the ink compositions have a high viscosity at low shear rates, they undergo shear-thinning and are readily flowable in response to shear rates produced in writing to provide a writing ink having an especially desirable combination of performance characteristics.

In the preferred writing instruments, the ink compositions are contained in hollow, non-pressurized or relatively low pressurized tubes or reservoirs and the ink is fed to the point of a ball point pen. In the especially preferred writing instruments, the ink is used in combination with a viscoelastic follower composition having specific rheological properties which insure a smooth, continuous flow of ink to the ball as the ink supply is consumed.

DETAILED DESCRIPTION OF PREFERRED EMBODIMENTS

Essential ingredients of the ink compositions of the present invention are a water dispersible polymeric, shear-thinning material, a substantially water insoluble but water dispersible polymeric, shock resistant providing material, colorants and a polar solvent system. Suitable water dispersible, shear-thinning materials include those materials disclosed in application Ser. No. 693,390 which can be dispersed in a highly polar solvent system to provide an ink having a shear-thinning index "n" between about 0.01 to about 0.60 and most preferably between about 0.05 to 0.30. The polymeric shear-thinning materials of aqueous ink compositions of the present invention are the essential ingredients which provide the primary control over the rheological and/or thixotropic characteristics of the ink compositions. Other thickening materials may be used in combination with the shear-thinning material(s) if desired to provide ink compositions having selected performance characteristics. However, such other materials are not needed or required to achieve the essential rheological and/or thixotropic control function provided by the shear-thinning material(s).

Polymeric shear-thinning materials suitable in the practice of the present invention are those which can provide aqueous based ink compositions having a shear thinning index between about 0.01 to about 0.60. Especially preferred polymeric shear-thinning materials additionally provide aqueous ink compositions which do not undergo a significant change in viscosity in response to temperature. For the purposes of this invention, "a significant change in viscosity in response to temperature" is a change of greater than about 50 percent in the viscosity measurement of the ink composition (at the same shear rate) over at least one segment of a successive temperature range of about 10° C. which is within the temperature range of from about 0° C. to about 60° C. Especially preferred shear-thinning materials are those which do not undergo any significant change in viscosity over a 10° C. temperature range segment within the temperature range between about 5° C. to about 35° C. In other words, especially preferred polymeric shear-thinning materials are those which provide aqueous ink compositions having the described shear thinning index and also provide ink compositions in which the change in viscosity measurement is not greater than about 50 percent between for example, 0° C.–10° C. or 10° C.–20° C. or 20° C.–30° C. or 25° C.–35° C., etc.

Especially preferred specific shear-thinning materials are xanthan gum, carageenan gum, locust bean gum, hydroxyethylcellulose and guar gum. Xanthan gum is the particularly preferred shear-thinning material and preferred commercially available xanthan gums are sold by The Kelco Company under the trade names KELTROL and KELZAN.

The amount of polymeric shear-thinning material useful in the ink composition of the invention can vary. However, amounts of shear-thinning material between about 0.1 to about 5 percent by weight of the material based on the total weight of the composition are normally suitable. In the case of the preferred shear-thinning materials, amounts between about 0.1 to about 2.0 percent are normally suitable.

The selection of a particular substantially water insoluble but water dispersible polymeric, shock resistant providing material and the amount thereof for use in ink compositions of the invention are controlled by two primary considerations. First, the selected polymeric, shock resistant providing material and the amount used must be capable of providing improved shock resistance to the ink composition. Secondly, the selected polymeric, shock resistant providing material and the amount used must not adversely affect or otherwise impair the shear-thinning capability nof the polymeric shear-thinning material of the ink composition. In other words, the ink composition will still provide a viscosity of no greater than about 100 m Pa.S at shear rates produced by writing despite the addition of the polymeric materials. Essentially, the polymeric, shock resistant providing materials useful in the practice of this invention are aqueous or partially aqueous polymeric latexes which provide a substantially water-insoluble polymeric residue when dry. Accoridngly, useful aqueous polymeric latexes include latexes of olefinic polymers including polymers and copolymers of unsaturated hydrocarbons, unsaturated hydrocarbon acids, unsaturated hydrocarbon alcohols, unsaturated hydrocarbon aldehydes and unsaturated hydrocarbon ketones. Other useful aqueous polymeric latexes include copolymers of olefins and diolefins, and condensation polymers such as polyesters, polyethers, polyamines, polyamides, and polyurethanes. Preferred aqueous polymeric latexes are those including the polymerized residue of such monomers as acrylonitrile, butadiene, chloroprene, isoprene, alkyl acrylates, alkyl methacrylates, styrene, vinyl acetate, vinyl chloride, vinylidene chloride, saturated or unsaturated diols or polyols, saturated or unsaturated dicarboxylic acids or esters, diisocyanates, and derivatives and mixtures of these monomers.

Essentially, the amount of polymeric, shock resistant providing material used in ink compositions of the invention is an amount effective to provide improved shock resistance but ineffective to impair the shear-thinning capability of the polymeric shear-thinning providing material. Amounts of polymeric, shock resistant providing material between about 1 to about 50 percent by weight of the ink composition are normally suitable. Preferred amounts of the especially preferred polymeric, shock resistant providing materials mentioned before are between about 5 to about 30. An especially preferred ink composition of the invention includes about 5–30 percent by weight of the polymeric, shock resistant providing material and about 0.3 to about 1.5 percent by weight xanthan gum.

Ink compositions of this invention are aqueous based shear-thinning inks and include a polar solvent system in which water is the primary solvent for the polymeric shear-thinning material(s). The polar solvent system may comprise from about 50 to about 99 percent by weight of the ink composition. While water is the primary or essential solvent of the solvent system, other polar solvents can be included in the solvent system in place of up to about 50 percent (or somewhat higher) by weight of the water in the solvent system. Preferred ink compositions of this invention are those having about 70 percent (or greater) by weight of water in the polar solvent system and ink compositions of this invention can comprise polar solvent systems having 100 percent by weight water or substantially 100 percent by weight water. In short, water is the primary solvent of the polar solvent systems of inks of the present invention and, the use of any other particular polar solvent and the amount thereof used in combination with water is not an especially critical feature in ink compositions of this invention.

Other polar solvents which may be included in the polar solvent systems of ink compositions of the invention are those which function as hygroscopic wetting agents useful in reducing the ink drying rates and include dihydric alcohols such as ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol, thiodiglycol, and the like. Other polar-solvent wetting agents include tri- and higher-hydric alcohols such as glycerin, trimethylolelhane, trimethylolpropane, 3-methyl-pentane-2,3,5-triol, diglycerin, sorbitol, pyrrolidone, N-methyl-2-pyrrolidone, dimethylformamide, urea, and the like. Preferred amounts of the other polar solvents which may be included in the polar solvent system are between about 5 to about 20 percent by weight of the total weight of the polar solvent system.

Ink compositions of this invention advantageously include an organic solvent material capable of penetrating into the paper-writing surface to act as a drying agent and also to act as a levelling agent for the ink to produce a smooth writing result. Examples of such materials include glycol ethers such as alkylene glycol mono- and di-alkyl ethers, glycol ether acetates such as alkylene glycol mono- and di-acetates and glycol acetates such as alkylene glycol mono- and di-acetates. The especially preferred drying and levelling function complex includes fluorinated polysilane surface active agents such as the product sold under the trademark LEVELENE 100 (American Color & Chemical Corp.). These materials can be used in amounts of 0.01 to 2.0% by weight, preferably 0.1 to 1.0%.

The colorant material employed in the inks of this invention may be any of the water-soluble or water dispersible dyes or pigments or mixtures thereof known to be useful in the formulation of inks for writing instruments and may comprise up to about 30% by weight of the inks. However, preferred inks of the present invention are water-fast and accordingly include colorants which are substantially water insoluble when the ink is dry. Examples of colorants which can be used include, but are not limited to, DIRECT VIOLET 99, DIRECT BLUE 86 (C. I. 74180), (both manufactured by the Mobay Chemical Co.); ELFTEX 5, MOGUL L. and REGAL 330R, all carbon blacks (The Cabot Corporation), HIDRACOL X9220 and X9200 (Ciba-Geigy); and FAST LIGHT ORANGE 2GM (American Cyanamid).

Ink compositions of the present invention can include sequestering agents to maintain or improve stability. These sequesterants are normally added in the amount of 1-50% by weight of the shear-thinning providing materials. Examples of useful sequestering agents include sodium hexametaphosphate, trisodium phosphate, and sodium glucoheptanate, and tetrasodium EDTA.

Ink compositions of the present invention can also include preservatives to prevent the growth of microorganisms, yeast, and mold. Examples of such preservatives include methyl p-hydroxybenzoate, propyl p-hydroxybenzoate, DOWICIL 75 and 200 (active ingredient: 1-(3-chloroallyl)-3,5,7-triaza-1azoniaadamantane chloride (Dow Chemical Co.). These biocides are typically present at 0.01-5% by weight of the ink.

When aqueous ink compositions of the invention are likely to come in contact with metals, corrosion inhibitors such as benzotriazole are often used. Such materials may constitute up to 5% by weight of the ink but are preferably used in amounts less than 0.5%.

Commercially available lubricants to reduce friction and wear between the ball and pen point may also be included in the ink compositions if desired. Generally, the amount of lubricant if used is less than about 1 percent by weight and usually about 0.5 percent or less.

The ink compositions of this invention are easily prepared by combining the desired ingredients in a blender or mixing with a propeller stirrer until homogeneity is achieved. Preferably the polymeric shear-thinning providing material is first added to distilled water and this combination mixed for about two hours. The other ingredients, if present, are added in the following order: other polar solvents, sequestering agents, preservatives, surfactants, corrosion inhibitors, and dyes and/or pigments. In some cases, it is advisable to pre-wet the water-dispersible gum with a humectant such as propylene glycol or glycerol. Generally, the amount of such humectant is 1 to 5 times by weight of the amount of water-soluble gum added. Preferably, the polymeric, shock resistant providing material is added to the ink composition as the last ingredient and mixed or blended with the composition in a blender.

Typical preferred ink compositions in the practice of the invention are contained in the illustrative Examples below.

EXAMPLE I

| Material | Weight gms. |
|---|---|
| Xanthan Gum | 0.6 |
| Benzotriazole | 0.3 |
| Biocide[1] | 0.3 |
| Glycerol | 5.0 |
| Ethylene Glycol | 5.0 |
| Acid Blue 9 | 4.7 |
| Acid Red 52 | 2.2 |
| Lubricant | 0.5 |
| Drying and Levelling Complex[2] | 0.5 |
| Water | 40.5 |
| Styrene-butadiene Latex[3] | 40.0 |

[1] The Biocide used was a commercially available product sold under the trade name KATHON CG by Rohn and Haas Co.
[2] The drying and levelling complex used was a commercially available flourinated polysilene surface active agent sold under the trade name LEVELENE 100 by American Color and Chemical Company.
[3] The styrene-butadiene latex used was a commercially available latex sold under the trade designation LPR 6632 by The Goodyear Company and contained 52.5 percent solids.

EXAMPLE II

Example I was repeated but 40 gms. of an acrylic latex were substituted for the styrene-butadiene latex of Example I. The acrylic latex used was sold under the trade designation AC-64 by Rohm & Haas Co. and contained 60 percent solids by weight.

EXAMPLE III

Example I was repeated but 40 gms. of a vinyl acetate-butyl acrylate latex were substituted for the styrene-butadiene latex of Example I. The vinyl acetate-butyl acrylate latex used was sold under the trade designation 76 RES 661 by Union Oil Company and contained 55 percent solids by weight.

EXAMPLE IV

Example I was repeated but 40 gms. of a non-film forming styrene latex were substituted for the styrene-butadiene latex of Example I. The non-film forming styrene latex used was sold under the trade name DAREX 670 by W. R. Grace Company and contained 51 percent solids by weight.

EXAMPLE V

Example I was repeated but 40 gms. of an ethylene-vinyl chloride latex were substituted for the styrene-butadiene latex of Example I. The ethylene-vinyl chloride latex used was sold under the trade name AIRFLEX 500 by Air Products Company and contained 50 percent solids by weight.

EXAMPLE VI

Example I was repeated but 40 gms. of a polyurethane latex were substituted for the styrene-butadiene latex of Example I. The polyurethane latex used was sold under the trade name SPENSOL L41 by Spensor-Kellog Company and contained 32 percent solids by weight.

EXAMPLE VII

| Material | Weight gms. |
| --- | --- |
| Xanthan Gum | 0.6 |
| Benzotriazole | 0.3 |
| Biocide (KANTHON CG) | 0.3 |
| Ethylene Glycol | 10.0 |
| Glycerol | 10.0 |
| Carbon Black[4.] | 15.0 |
| Surfactant | 0.5 |
| Drying and Levelling Complex (LEVELENE 100) | 0.5 |
| Water | 22.8 |
| Vinyl Acetate-Butyl Acrylate Latex (76 RES 661 - Example II - 55 percent solids) | 40.0 |

[4.] The carbon black used was a carbon black pigment dispersion sold under the trade name ECCOBRITE BLACK VB by Eastern Color and Pigment Company.

The inks of Examples I–VII provide an excellent combination of desired writing performance characteristics. The writing is smooth and without excessive skipping, blotting, blobbing or leakage and the color of the writing is dark and of uniform smoothness and quality. The inks of Examples I–VI include water soluble dye colorants. Accordingly, the inks of these Examples may not be completely water-fast because water may solubilize some of the dye from the dry ink residue. However, the ink of Example VII includes a colorant which is substantially water insoluble in the dry ink residue and therefore the ink of Example VII is a permanent, water-fast ink. Nevertheless, the inks of Examples I–VI do provide an improved degree of water-fastness because the coalesced latex residue is substantially water insoluble in the dry ink residue and can coat, encapsulate or otherwise retain water soluble colorants in the dry residue to thereby control solubilization of these dyes by water.

EXAMPLE VIII

In order to demonstrate the improved shock resistance of the aqueous based shear-thinning inks of the present invention, a comparison of the shock resistance of the inks of Examples I–VIII and a Control shear-thinning ink are presented below. The composition of the control shear-thinning ink was as follows:

| Material | Weight gms. |
| --- | --- |
| Xanthan Gum | 1.0 |
| Benzotriazole | 0.3 |
| Biocide (KATHON CG) | 0.3 |
| Glycerol | 5.0 |
| Ethylene Glycol | 5.0 |
| Acid Blue 9 | 4.7 |
| Acid Red 52 | 2.2 |
| Lubricant | 0.5 |
| Drying and Levelling Complex (LEVOLENE-100) | 0.5 |
| Water | 80.5 |

The addition of the latexes to the ink compositions of Examples I–VII containing 0.6 percent by weight xanthan gum provided ink compositions having somewhat increased viscosities. In order to present a comparison between shear-thinning inks having substantially the same viscosities, a concentration of 1 percent by weight xanthan gum was needed in the control ink.

Each ink was included in the unpressurized reservoir of identical ball point pens (1.5 mls. ink in each reservoir) and the shock-resistant properties of each ink were determined in accordance with the following Tapping Test Procedure.

TAPPING TEST PROCEDURE

1. Handwrite 10 Johnson's.
2. Drop pen, point up, 10 times from a height of 1".
3. Immediately handwrite 10 Johnson's.
4. Store pen, point up, for 1 hour.
5. After 1 hour, handwrite 10 Johnson's.
6. Repeat 1–5 for 10 pens of each group.
7. Report % of 100 Johnson's from #3 which are acceptable (Score #3).
8. Report % of 100 Johnson's from #5 which are acceptable (Score #5).

The above Tapping Test Procedure involved apparatus designed to retain the pen in a vertical position and repeatedly drop or tap the retained pen from a controlled height of one inch ten times so that the shock force sustained in each drop is substantially constant for each pen tested.

Table A below summarizes the shock-resistant properties of the tested inks.

TABLE A

| Ink | Score #3 | Score #5 |
| --- | --- | --- |
| Control | 39 | 75 |
| Example I | 99 | 100 |
| Example II | 98 | 97 |
| Example III | 98 | 98 |
| Example IV | 73 | 88 |
| Example V | 97 | 100 |
| Example VI | 87 | 86 |
| Example VII | 95 | 100 |

Score #3 and Score #5 of Table A represent the percentage derived from an examination of 100 writings of the word "Johnson" with each of the inks tested. The word "Johnson" has been selected since it is considered to be the best written word to evaluate the propensity of an ink which has been subjected to shock to skip or display starving which are characteristics evidencing the effects of shock. In the examination of the 100 writings, a score of 1 percentage point is given to each "Johnson" which has no observable skip or starved areas. No percentage point is given to a "Johnson" providing a skip or starved area. Score #3 generally reflects the immediate effect of back shock on an ink while Score #5 reflects longer term effects of shock. As can be seen from Table A, the inks of the present invention provide significantly improved shock resistance as compared to the control ink particularly with respect to Score #3.

The reservoirs of the pens tested in Example VIII included a viscoelastic follower composition which comprised mineral oil, polybutene and clay (BENTONE 34). The preferred viscoelastic follower compositions for use in combination with the shock-resistant shear-thinning inks of the present invention are described in detail in U.S. patent application Ser. No. 693,930 already incorporated by reference. Essentially the preferred viscoelastic follower compositions comprise from about 5 to about 99 percent by weight of the composition of mineral oil, from about 5 to about 99 percent by weight polybutene and from about 0.1 to about 10 percent by weigt of an organophilic clay. The relative proportions of the above ingredients are selected so that the resultant follower composition exhibits increasing tan delta values over the shear rate range of 5 to 30,000 sec$^{-1}$ and also exhibit tan delta values of less than about 1 at shear rates up to 50 sec$^{-1}$.

Writing or marking instruments of the present invention include structural elements common to conventional and commercially available ball-point writing instruments. Essentially, these elements include a body retaining an ink reservoir, means for delivery of the ink from the reservoir to a socket located at one end of the instrument and a rotatable point retained in the socket and adapted to apply ink delivered to the socket to a surface to provide visible markings on the surface. The especially preferred instruments or pens include a viscoelastic follower of the type described above in the reservoir.

From the above description it is apparent that the novel improved shear-thinning inks of the present invention provide significant and unexpected advantages. They have high viscosities at low shear rates and accordingly do not present leakage problems in writing instruments such as roller ball writing instruments. However, when subjected to shear rates such as are produced in writing, the inks undergo shear-thinning and are readily flowable to provide writing of excellent quality and performance characteristics. Additionally the shear-thinning inks have improved water fastness and can be made permanently water fast by the use of colorants which are substantially water insoluble in the dry ink residue. Moreover, the inks are substantially shock-resistant and therefore provide an effective solution to a problem long outstanding in the art. Accordingly, the invention presents to the art improved, shear-thinning inks which present an idealized combination of desired performance characteristics and which are unexpectedly different from shear-thinning inks known to the art at the time this invention was made.

I claim:

1. A shock-resistant, shear-thinning ink composition having a viscosity no greater than about 100 m Pa.s at shear rates produced by writing and consisting essentially of from about 50 to about 99 percent by weight of the composition of a polar solvent system including at least about 50 percent by weight water, an effective amount of colorant material, an amount of a water dispersible polymeric shear-thinning material sufficient to provide an ink having a shear thinning index between about 0.01 to about 0.60 and an amount of a substantially water insoluble polymeric, shock resistant providing material effective to provide shock-resistance for the ink composition but ineffective to substantially affect the shear-thinning capability of the polymeric shear-thinning providing material.

2. A composition of claim 1 where the ink has a shear-thinning index between about 0.05 to about 0.30.

3. A composition of claim 1 where the shear-thinning material is present in an amount between about 0.1 to about 5 percent by weight of the composition.

4. A composition of claim 1 where the shear-thinning material comprises xanthan gum or carageenan gum or locust bean gum or hydroxyethylcellulose or guar gum or mixtures of these.

5. A composition of claim 1 where the polymeric, shock resistant providing material is a styrene polymer, a styrene-butadiene polymer, an acrylic polymer, an ethylene vinyl chloride polymer, a urethane polymer, a vinyl acetate polymer or mixtures of these.

6. A composition of claim 1 where the polymeric, shock resistant providing material is present in an amount from about 1 to about 50 percent by weight of the composition.

7. A composition of claim 1 where the polymeric, shock resistant providing material is present in an amount from about 5 to about 30 percent by weight of the composition.

8. A composition of claim 1 where the colorant material is substantially water insoluble.

9. A composition of claim 8 where the polymeric, shock resistant providing material is a styrene polymer, a styrene-butadiene polymer, an acrylic polymer, an ethylene vinyl chloride polymer, a urethane polymer, a vinyl acetate polymer or mixtures of these.

10. A composition of claim 9 where the shear-thinning material is xanthan gum.

11. A composition of claim 1 where the shear thinning material is xanthan gum in an amount between about 0.01 to about 5 percent by weight and the polymeric, shock resistant providing material is a styrene polymer, a styrene-butadiene polymer, an acrylic polymer, an ethylene vinyl chloride polymer, a urethane polymer, a vinyl acetate polymer or mixtures of these in an amount between about 5 to about 30 percent by weight of the composition.

12. A composition of claim 1 where the colorant material is substantially water soluble.

13. A composition of claim 1 where the polar solvent system comprises a mixture of at least about 50 percent by weight of water and the remainder comprises at least one polar solvent other than water.

14. A composition of claim 13 where the polar solvent other than water is glycerol, ethylene glycol, propylene glycol or mixtures of these.

15. A composition of claim 1 including a drying and levelling agent.

16. A composition of claim 15 where the drying and levelling agent is a fluorinated polysilane surface active agent, a glycol ether, a glycol ether acetate, a glycol acetate or mixtures of these.

17. A shock-resistant, shear-thinning ink composition having a viscosity less than about 100 m Pa.s at shear rates produced by writing and consisting essentially of from about 50 to about 99 percent by weight of the composition of a polar solvent system including at least about 50 percent by weight water, and effective amount of colorant material, from about 0.1 to about 5 percent by weight of xanthan gum and from about 5 to about 30 percent by weight of a styrene polymer, a styrene-butadiene polymer, an acrylic polymer, an ethylene vinyl chloride polymer, a urethane polymer, a vinyl acetate polymer or mixtures of these.

18. A composition of claim 16 where the colorant material is substantially water insoluble.

19. A writing instrument comprising a reservoir including a shock-resistant, shear-thinning ink composition having a viscosity no greater than about 100 m Pa.S at shear rates produced by writing and consisting essentially of from about 50 to about 99 percent by weight of the composition of a polar solvent system including at least about 50 percent by weight water, an effective amount of colorant material, an amount of a water dispersible polymeric shear-thinning material sufficient to provide an ink having a shear-thinning index between about 0.01 to about 0.60 and an amount of a substantially water insoluble polymeric, shock resistant providing material effective to provide shock-resistance the ink composition but ineffective to substantially affect the shear-thinning capability of the polymeric shear-thinning providing material.

20. A writing instrument of claim 19 where the ink has a shear-thinning index between about 0.05 to about 0.30.

21. A writing instrument of claim 19 where the shear-thinning material of the ink is present in an amount between about 0.1 to about 5 percent by weight of the ink composition.

22. A writing instrument of claim 19 where the shear-thinning material of the ink comprises xanthan gum or carageenan gum or locust bean gum or hydroxyethylcellulose or guar gum or mixtures of these.

23. A writing instrument of claim 19 where the polymeric, shock resistant providing material of the ink is a styrene polymer, a styrene-butadiene polymer, an acrylic polymer, an ethylene vinyl chloride polymer, a urethane polymer, a vinyl acetate polymer or mixtures of these.

24. A writing instrument of claim 19 where the polymeric, shock resistant providing material in the ink is present in an amount from about 1 to about 50 percent by weight of the ink composition.

25. A writing instrument of claim 19 where the polymeric, shock resistant providing material in the ink is present in an amount from about 5 to about 30 percent by weight of the ink composition.

26. A writing instrument of claim 19 where the colorant material in the ink is substantially water soluble.

27. A writing instrument of claim 26 where the polymeric, shock resistant providing material of the ink is a styrene polymer, a styrene-butadiene polymer, an acrylic polymer, an ethylene vinyl chloride polymer, a urethane polymer, a vinyl acetate polymer or mixtures of these.

28. A writing instrument of claim 27 where the shear-thinning material in the ink is xanthan gum in an amount between about 0.01 to about 5 percent by weight and the polymeric, shock resistant providing material is a styrene polymer, a styrene-butadiene polymer, an acrylic polymer, an ethylene vinyl chloride polymer, a urethane polymer, a vinyl acetate polymer or mixtures of these.

29. A writing instrument of claim 19 where the colorant material in the ink is substantially water soluble.

30. A writing instrument of claim 19 where the polar solvent system of the ink comprises a mixture of at least about 50 percent by weight water and the remainder comprises at least one polar solvent other than water.

31. A writing instrument of claim 30 where the polar solvent other than water is glycerol, ethylene glycol, propylene glycol or mixtures of these.

32. A writing instrument of claim 19 where the ink includes a drying and levelling agent.

33. A writing instrument of claim 32 where the drying and levelling agent is a fluorinated polysilane surface active agent.

34. A writing instrument of claim 19 where a viscoelastic ink follower is included in the reservoir.

* * * * *